(12) United States Patent
Liang et al.

(10) Patent No.: US 8,924,041 B2
(45) Date of Patent: Dec. 30, 2014

(54) VEHICLE CENTRAL LOCK ANTITHEFT METHOD AND SYSTEM

(75) Inventors: Fenghua Liang, Chongqing (CN); Peng Liang, Chongqing (CN); Jugang He, Chongqing (CN)

(73) Assignee: Chongqing Changan Automobile Co., Ltd., Chongqing (CN)

( * ) Notice: Subject to any disclaimer, the term of this patent is extended or adjusted under 35 U.S.C. 154(b) by 683 days.

(21) Appl. No.: 12/810,223

(22) PCT Filed: Jun. 30, 2008

(86) PCT No.: PCT/CN2008/071486
§ 371 (c)(1),
(2), (4) Date: Jun. 23, 2010

(87) PCT Pub. No.: WO2009/105946
PCT Pub. Date: Sep. 3, 2009

(65) Prior Publication Data
US 2010/0286846 A1 Nov. 11, 2010

(30) Foreign Application Priority Data
Feb. 27, 2008 (CN) .......................... 2008 1 0069398

(51) Int. Cl.
B60R 25/04 (2013.01)
H04L 9/00 (2006.01)
H04L 9/32 (2006.01)
B60R 25/24 (2013.01)

(52) U.S. Cl.
CPC ................ B60R 25/04 (2013.01); B60R 25/24 (2013.01)
USPC .................................. 701/2; 380/29; 713/168

(58) Field of Classification Search
CPC ................................ B60R 25/04; B60R 25/24
USPC ...................... 700/2; 701/2; 380/29; 713/168
See application file for complete search history.

(56) References Cited

U.S. PATENT DOCUMENTS 5,555,863 A * 9/1996 Kokubu ...................... 123/179.3
5,955,940 A 9/1999 Chen ........................ 340/426.17
(Continued)

FOREIGN PATENT DOCUMENTS

CN 1100046 3/1995
CN 1374217 10/2002
(Continued)

OTHER PUBLICATIONS

Extended European Search Report in European Application No. 08773064.4-1523 / 2246227 PCT/CN2008071486 dated Dec. 4, 2012.

*Primary Examiner* — Calvin Cheung
*Assistant Examiner* — Yazan A Soofi
(74) *Attorney, Agent, or Firm* — Fulbright & Jaworski LLP (57) ABSTRACT

A vehicle central lock antitheft method and system includes a central lock system which is connected by radio with a remote controller for identity verification using rolling codes (S101, S102), wherein the central lock system chooses a security state (S103) and transmits the security state to an engine management system according to the verification result, the ignition IG status and the door switch status signal indicating opening or closing of the door (S104). The engine management system receives the security state transmitted by the central lock system and verifies the identity of the central lock system by code matching (S106); security identification between the engine management system and the central lock system is carried out by bidirectional encryption communication (S107). The engine management system then decides whether or not to lock the engine according to the result of the security identification.

17 Claims, 4 Drawing Sheets

(56) References Cited

U.S. PATENT DOCUMENTS

| | | | |
|---|---|---|---|
| 6,292,018 B1* | 9/2001 | Kean | 326/41 |
| 8,527,135 B2* | 9/2013 | Lowrey et al. | 701/29.1 |
| 2004/0262068 A1* | 12/2004 | Matsubara et al. | 180/287 |
| 2009/0207004 A1* | 8/2009 | Ziska et al. | 340/426.1 |
| 2010/0014659 A1* | 1/2010 | Shibutani et al. | 380/28 |

FOREIGN PATENT DOCUMENTS

| | | |
|---|---|---|
| CN | 1453165 | 11/2003 |
| CN | 1752996 | 3/2006 |
| CN | 1830707 | 9/2006 |
| CN | 2886942 | 4/2007 |
| EP | 0894 973 A1 | 2/1999 |
| EP | 894973 A1 * | 2/1999 |
| EP | 1 065 112 | 1/2001 |
| JP | 10-16711 | 1/1998 |
| JP | 2002-79911 | 3/2002 |

* cited by examiner

VEHICLE CENTRAL LOCK ANTITHEFT METHOD AND SYSTEM

CROSS-REFERENCE TO RELATED APPLICATIONS

This application is a national phase application under 35 U.S.C. §371 of International Application No. PCT/CN2008/071486 filed Jun. 30, 2008, which claims priority to Chinese Patent Application No. 200810069398.9, filed with the Chinese Patent Office on Feb. 27, 2008 and entitled "VEHICLE CENTRAL CONTROL ANTITHEFT METHOD AND SYSTEM". The entire text of each of the above-reference disclosure is specifically incorporated herein by reference without disclaimer.

FIELD OF THE INVENTION

The present invention relates to the field of vehicle antitheft technologies and in particular to a vehicle central control antitheft method and system.

BACKGROUND OF THE INVENTION

There are a variety of vehicle antitheft modes among which vehicle body antitheft mode and engine locking antitheft mode are widely applied at present.

With traditional vehicle body antitheft mode, a vehicle door is controlled to be opened and closed via a remote control attached to an alarm device which will raise a sound and light alarm if the door is not opened via the remote control. Also a shake monitoring gating control protection can be provided so that the alarm device will also raise an alarm upon sensing a shake to which the vehicle is subject. However, such antitheft mode fails to substantially prevent the vehicle from theft.

In view of the drawback occurring with vehicle body antitheft mode, engine locking antitheft mode can substantially prevent a vehicle from theft by locking an engine, but such protection requires to add a new hardware device for instructing an engine management system to lock the engine while raising a sound and light alarm, thus adding the cost of a vehicle antitheft system.

No solution has been available so far in the prior art to substantially preventing a vehicle from theft without any additional new hardware device.

SUMMARY OF THE INVENTION

The invention integrates a part of advantages of vehicle body antitheft mode and engine lock antitheft mode to form a new central control antitheft method and system in order to achieve secured vehicle antitheft at a low cost. With this antitheft system, the vehicle can dispensed with a separate antitheft system, and the vehicle can be substantially protected from theft without any additional new hardware device. Technical solutions are as follows:

The invention provides a vehicle central control antitheft method, which includes:
  performing, by a central control system, identity verification for a remote control via cipher matching;
  selecting, by the central control system, an alert status in response to a result of identity verification of the remote control, the status of an ignition switch and an action of opening or closing a vehicle door, and transmitting the alert status to an engine management system;
  receiving, by the engine management system, the alert status transmitted from the central control system, and performing identity verification for the central control system via cipher matching;
  performing safety authentication between the engine management system and the central control system in bidirectional encrypted communication.

The invention further provides a vehicle central control antitheft system, which includes a remote control, a central control system and an engine management system, wherein:
  the central control system performs identity verification for the remote control via cipher matching; and
  the engine management system communicates with the central control system via a data bus, performs identity verification for the central control system via cipher matching and safety authentication with the central control system in bidirectional encrypted communication, and locks or unlocks an engine in response to a result of safety authentication.

With the foregoing technical solutions, specific addition hardware device of a antitheft system will not be required except for some modification to software, thus resulting in substantially no increase of the cost thereof, and the engine management system can lock the engine by locking an oil path and oil injection to thereby substantially prevent a vehicle from theft.

BRIEF DESCRIPTION OF THE DRAWINGS

FIG. 2A is a schematic diagram of alert status transition of the central control system when an ignition switch is in the OFF status, and FIG. 2B is a schematic diagram of alert status transition of the central control system when the ignition switch is in the ON status;

DETAILED DESCRIPTION OF THE INVENTION

Firstly, a vehicle central control method according to the invention will be described as follows.

A remote control and a controller of a central control system perform identity verification via cipher matching which can be secure hopping code algorithms such as Keelog, AES, etc.

The central control system selects an alert status in response to a result of identity verification of the remote control and the central control system, the status of an ignition switch and an action of opening or closing a vehicle door.

The central control system transmits the alert status to an engine management system via cipher matching which can be secure hopping code algorithms such as Keelog, AES, etc, and performs identity verification with the engine management system.

The engine management system and the central control system perform safety authentication in bidirectional encrypted communication.

The engine management system locks or unlocks an engine in response to a result of safety authentication.

Particularly, the remote control can include a remote key.

The central control system communicates with the engine management system over a data bus.

The engine management system can lock or unlock the engine by controlling oil injection.

With a cipher, the invention can both match the remote control and match the central control system and the engine management system. The central control system and the engine management system can further perform safety authentication in bidirectional encrypted communication. Thus for the purpose of protection against theft, the engine can not be initiated using an unverified remote control or otherwise.

Embodiments of the invention will be detailed below with reference to the drawings.

Figure 1:
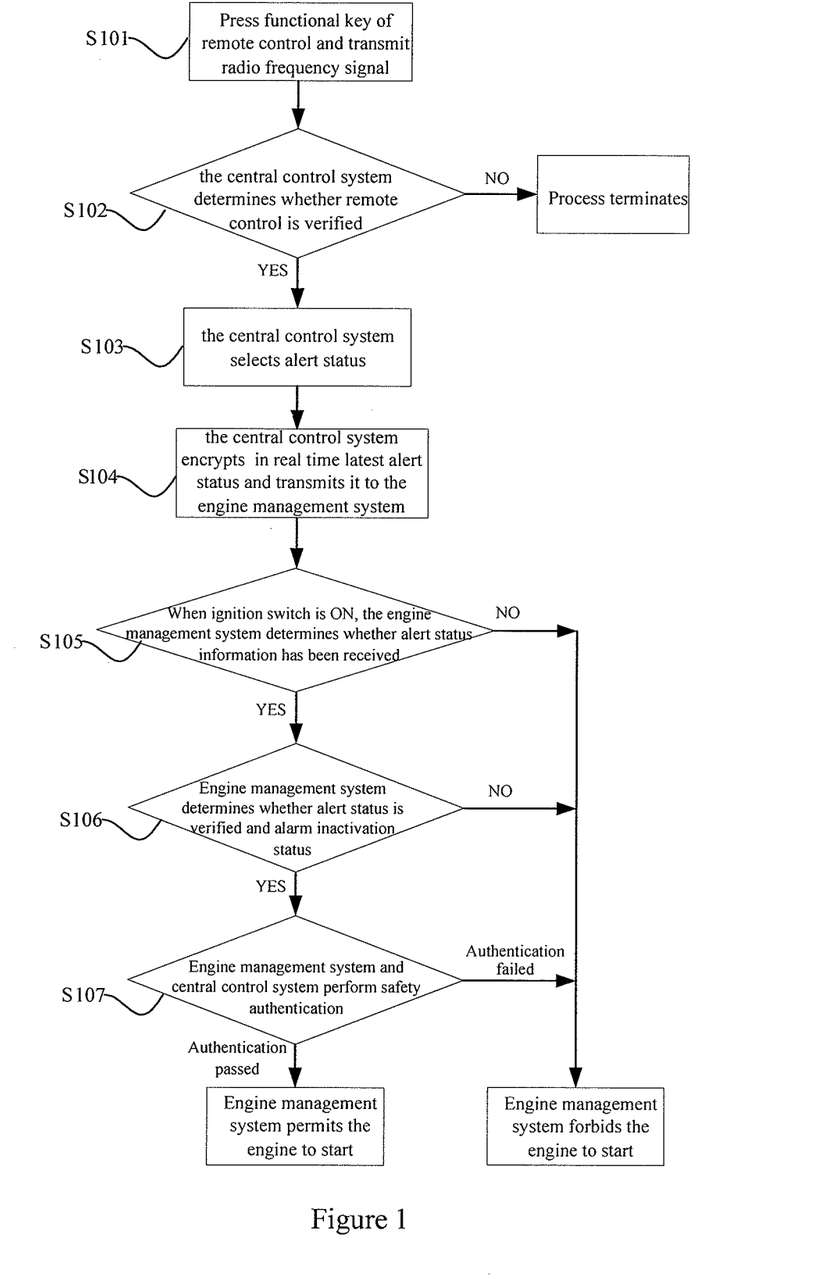
FIG. 1 is an operation flow chart of an antitheft system according to the invention.

FIG. 1 is an operation flow chart of an antitheft system according to the invention, specific steps of which are as follows:

S101: a functional key of the remote control is pressed, wherein the remote control firstly encrypts the status of the functional key and then modulates encrypted data into a radio frequency signal for transmission.

An encryption algorithm can be derived from Keelog algorithm, AES algorithm or like, and regardless of whichever algorithm is in use, general requirements are as follows:

(1) A manufacturer will be held a serial number and a manufacturer code in the algorithm in strict confidence; and (2) In the algorithm, there are a cryptographic key of no less than 64 bits, a synchronous counter of no less than 16 bits and a hopping code of no less than 32 bits.

Taking Keelog algorithm here as an example, a process for encoding the remote control chip is described as follows: involved codes include a manufacturer code, a product serial number of the remote key, cryptographic key, the number of synchronous count, an identification code, the status of the functional key typically including LOCKED, UNLOCKED and NORMALLY OPEN, etc.

Firstly, the cryptographic key is derived from the manufacturer code and the product serial number of the remote key in the encryption algorithm; when the key of the remote control is pressed, the number of synchronous count, the identification code and the status of the functional key are encrypted into encrypted data in Keelog algorithm; and then the product serial number of the remote key, the status of the functional key and the encrypted data are modulated and transmitted by a transmitting circuit of the remote control. Particularly, modulation can include PWM or Manchester modulation.

S102: the central control system receives, demodulates and decrypts the radio frequency signal transmitted from the remote control and then determines whether the remote control is verified, and if so, then the process goes to S103; otherwise, the central control system does not respond, and the process terminates in this step.

The central control system firstly demodulates the received radio frequency signal into the product serial number of the remote key, the status of the functional key and the encrypted data, and then decrypts the encrypted data into decrypted data (including the number of synchronous count, the identification code and the status of the functional key) in Keelog decryption algorithm.

The central control system determines whether the decrypted data is verified in view of the following three items:

(1) The decrypted "identification code" is compared with the last 10 bits in the demodulated "product serial number of the remote key" for equality, and if they are equal, then the decrypted data is verified; otherwise, it is unverified;

(2) The decrypted "status of the functional key" is compared with the demodulated "status of the functional key" for equality, and if they are equal, then the decrypted data is verified; otherwise, it is unverified;

(3) It is determined whether the decrypted "the number of synchronous count" is incremented reasonably from the "the number of synchronous count" stored in the central control system, that is, by more than zero, and if so, then the decrypted data is verified; otherwise, it is unverified.

If the decrypted data is verified, then the process goes to S103; otherwise, the central control system does not respond, and the process terminates in this step.

S103: the central control system selects an alert status according to the status of the functional key, the status of the ignition switch and an action of opening or closing the vehicle door.

Figure 2:
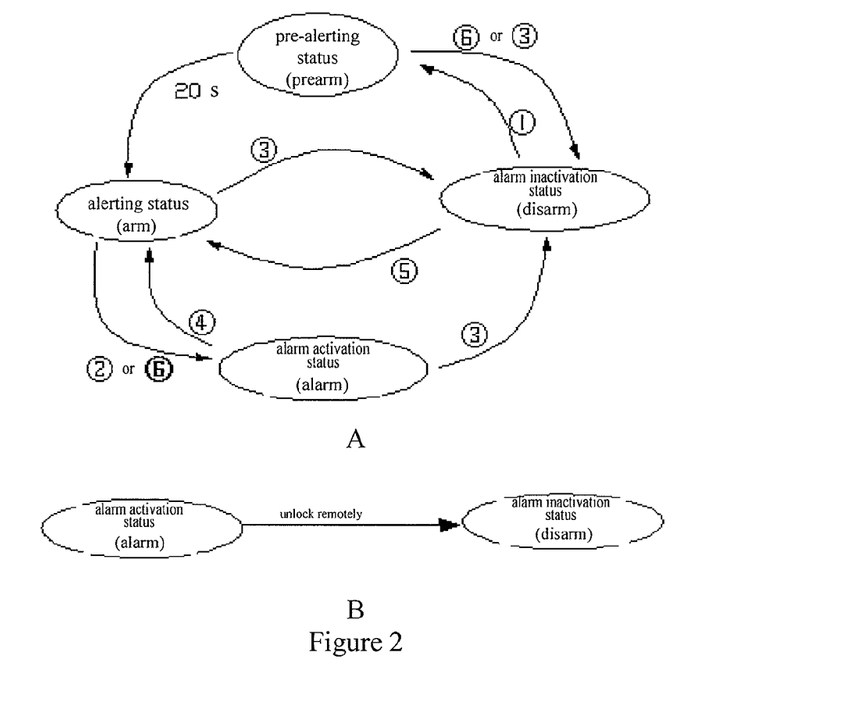
FIG. 2 is a schematic diagram of alert status transition of a central control system according to the invention, where

An alert status of the central control system can be selected as illustrated in FIG. 2. Referring to FIG. 2, firstly if the ignition switch is in the OFF status, then there totally are four alert statuses in the central control system, i.e., a pre-alerting status (PREARM), an alerting status (ARM), an alarm activation status (ALARM) and an alarm inactivation status (DISARM), which can transition to each other under six specific conditions including: (1) locking the door remotely: locking the door remotely can be triggered in response to the status of a functional key "LOCK" of the remote key; (2) opening the door unverifiedly: an action of opening the door performed in the case that the central control system determines no unlocking via a verified remote control can be deemed as unverified opening of the door, where the action of opening the door can be sensed by the central control system via a switch of the vehicle door status; (3) unlocking remotely: unlocking remotely can be triggered in response to the status of a functional key "UNLOCK" of the remote key; (4) completing an alarm: the alarm may be in the form of a sound and light alarm, e.g., a sound alarm of 28s, a flash alarm of 258s; (5) automatic relocking: automatic relocking may be conditioned on no opening of the door for a period of time from unlocking remotely; and (6) transiting the status of the ignition switch from OFF to ON: specific transition can be as follows: the pre-alerting status can transition to the alarm inactivation status in response to the condition (6) or (3) and to the alerting status under the condition of a 20-second delay; the alerting status can transition to the alarm activation status in response to the condition (2) or (6) and to the alarm inactivation status in response to the condition (3); the activation status can transition to the alerting status in response to the condition (4) and to the alarm inactivation status in response to the condition (3); and the alarm inactivation status can transition to the pre-alerting status in response to the condition (1) and to the alerting status in response to the condition (5).

Referring to FIG. 2B, if the ignition switch is in the ON status, then there are only two alert statuses of the central control system: the alarm activation status (ALARM) and the alarm inactivation status (DISARM), and the former can transition to the latter only upon unlocking via the remote key, but the latter can not transition to the former.

Upon occurrence of the alarm activation status, the central control system initiates immediately a peripheral alarm of the vehicle by activating both a long alarm of a vehicle warning horn and an emergence warning lamp.

S104: the console system encrypts in real time latest alert status and transmits the encrypted alert status to the engine management system via a communication bus.

Once the alert status is changed, the central control system will encrypt the latest alert status and then transmit them to the engine management system. Specific encryption thereof is similar to that of S101 except for transition of the status of the functional key in S101 to the alert status here.

S105: when the ignition switch is switched on, the engine management system determines whether any alert status information transmitted from the central control system has been received, and if so, then the process goes to S106; otherwise, the process terminates, and the engine management system forbids the engine to start.

S106: the engine management system receive and decrypts encrypted data of the alert status transmitted from the central control system and determines whether the alert status is verified and is the alarm inactivation status, and if so, then the process goes to S107; otherwise, the process terminates, and the engine management system forbids the engine to start.

The step for determining the alert status at the engine management system is similar to that of S102 except for transition of the status of the functional key in S101 to the alert status here.

S107: the engine management system and the central control system perform safety authentication in bidirectional encrypted communication, and if authentication is passed, then the engine management system permit the engine to start; otherwise, the process terminates, and the engine management system forbids the engine to start.

Figure 3:
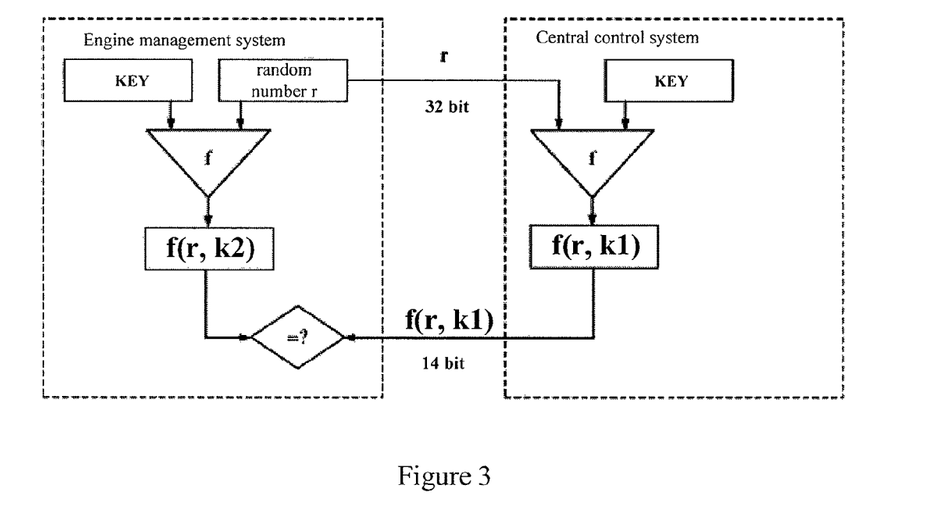
FIG. 3 is a schematic diagram of an authentication process between the central control system and an engine management system.
Figure 4:
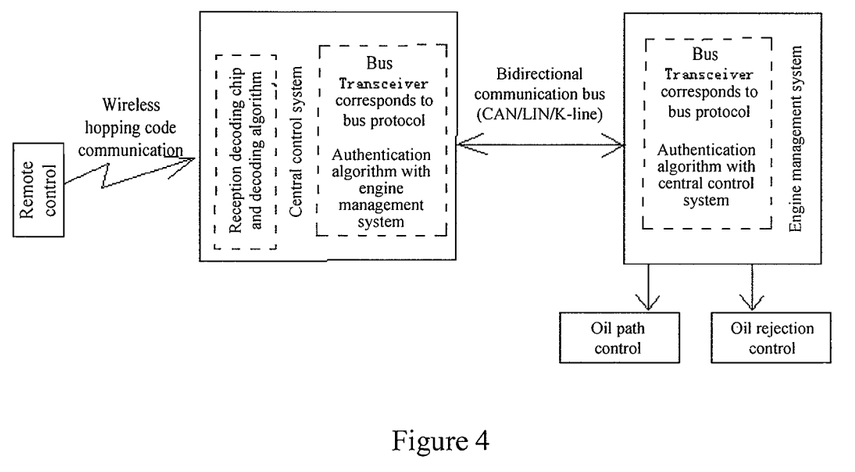
FIG. 4 is a structural schematic diagram of the central control system according to the invention.

A process of an identity authentication algorithm is as illustrated in FIG. 3: the engine management system firstly generates a random number r (32 bits) and then uses the random number for concurrent execution of two instruction:

(1) r is transmitted to the central control system via the communication bus; and (2) r is encrypted using a cryptographic key k2 (64 bits) into f(r, k2).

The central control system receives the random number r transmitted from the engine management system and encrypts the random number r into f(r, k1) by using a cryptographic key k1 (64 bits) and transmits f(r, k1) to the engine management system via the communication bus.

The engine management system compares f(r, k1) with f(r, k2), and if f(r, k1)=f(r, k2), then it indicates correspondence of the central control system to the engine management system, and the engine is permitted to start; otherwise, the engine is forbidden to start.

Control logic of the foregoing flow can be implemented in software, and the engine management system can forbid the engine to start by locking oil injection and shutting off an oil path to thereby avoid a security risk arising from a common antitheft system which shuts off an oil path via a relay (where a thief may start the vehicle by switching on the relay directly via an external power supply).

Based upon the foregoing vehicle central control antitheft method, the invention further provides a vehicle central control antitheft system for implementing the method, which includes a remote control, a central control system and an engine management system.

The central control system performs identity verification for the remote control via cipher matching.

The engine management system communicates with the central control system via a data bus, performs identity verification for the central control system via cipher matching and safety authentication with the central control system in bidirectional encrypted communication, and locks or unlocks an engine in response to a result of safety authentication.

Particularly, the central control system communicates wirelessly with the remote control and performs identity authentication for the remote control in a hopping code algorithm.

The engine management system communicates with the central control system via the data bus and performs identity authentication for the central control system in a hopping code algorithm.

The engine management system can lock or unlock the engine by controlling oil rejection.

The vehicle central control antitheft system will be detailed below.

For a remote key, its software includes a hopping encoding algorithm for verification with the central control system, which has been applied to a general remote key and which can be derived from Keelog algorithm, AES algorithm or like, and regardless of whichever algorithm is in use, general requirements are as follows:

(1) A manufacturer will be held a serial number and a manufacturer code in the algorithm in strict confidence; and (2) In the algorithm, there are a cryptographic key of no less than 64 bits, a synchronous counter of no less than 16 bits and a hopping code of no less than 32 bits.

For the central control system, its software includes:

1. A hopping decoding algorithm for identification of the remote key (which has been provided in general central control system), which can be derived from Keelog algorithm, AES algorithm or like. Regardless of whichever algorithm is in use, general requirements are as follows:

(1) A manufacturer strictly will be held a serial number and a manufacturer code in the algorithm in strict confidence;

(2) In the algorithm, there are a cryptographic key of no less than 64 bits, a synchronous counter of no less than 16 bits and a hopping code of no less than 32 bits; and (3) This algorithm corresponds to the encoding algorithm of the remote key.

2. An encoding algorithm for hopping code verification with the engine management system, which is required substantially the same as the hopping encoding algorithm in the remote control except for transition of the status of a functional key (a key of the remote control system) for an input to the encoding algorithm in the remote control to the alert status of the central control system here.

3. Peripheral antitheft alarm logic in which the alert status of the central control system is retrieved as in S103.

4. A communication protocol of a CAN bus, an LIN bus or K-Line, which includes CAN2.0A, CAN2.0B, LIN1.4-2.1 and any subsequent protocol, K-Line, etc.

5. Safety authentication program of the central control system with the engine management system, where upon completion of authentication of the remote key with the central control system, the ignition switch is switched on, that is, the program is initiated, and a principle of the authentication program is as described of S107.

For the engine management system, its software includes:

1. A communication protocol of a CAN bus, an LIN bus or K-Line, which includes CAN2.0A, CAN2.0B, LIN1.4-2.1 and any subsequent protocol, K-Line, etc.

2. A decoding algorithm for hopping code verification with the central control system, which is required substantially the same as the hopping decoding algorithm for verification with the remote control in the central control system except for transition of the status of a functional key for an output from the encoding algorithm in the central control system to the alert status of the central control system in the engine management system.

3. Authentication program of the central control system with the engine management system, where upon If the hardware interface is the LIN bus, then it can comply with the protocol of LIN1.4, LIN2.0 or LIN2.1.

If the hardware interface is K-Line, then it can comply with the protocol of K-Line.

Relevant communication messages between the central control system and the engine management system can be as illustrated in Table 1.

TABLE 1

| Signal name | Length | Transmission mode | Sender | Receiver | Meaning |
|---|---|---|---|---|---|
| Central control status code | 66 bits | Trigger | Central control system | Engine management system | Central control status transmitted from central control system to engine management system |
| Random number | 32 bits | Trigger | Engine management system | Central control system | Random number r transmitted from engine management system to central control system in FIG. 3 |
| Encryption result | 14 bits | Trigger | Central control system | Engine management system | Random number f(r, k1) transmitted from central control system to engine management system in FIG. 3 | completion of authentication of the remote key with the central control system, the ignition switch is switched on, that is, the program is initiated, and a principle of the authentication program is as described of S107.

Here, it is required in principle that encoding chip and decoding chip implementing the hopping algorithms are provided from the same supplier unless the decoding process is performed directly by an MCU of the central control system, and on the precondition that this requirement is satisfied, the hopping algorithm can be an algorithm built in the encoding chip itself or specific to a vehicle manufacturer (where the algorithm can be written separately into the encoding chip and decoding chip), and regardless of whichever specific scenario, the encoding chip and decoding chip shall ensure execution of the hopping algorithms.

With specific requirements for the encoding chip and decoding chip and comparing with a microchip, a chip selected as the encoding chip shall have respective performance indexes equivalent or superior to those of HCS200, and a chip selected as the decoding chip shall have respective performance indexes equivalent or superior to those of HCS512.

Figure 5:
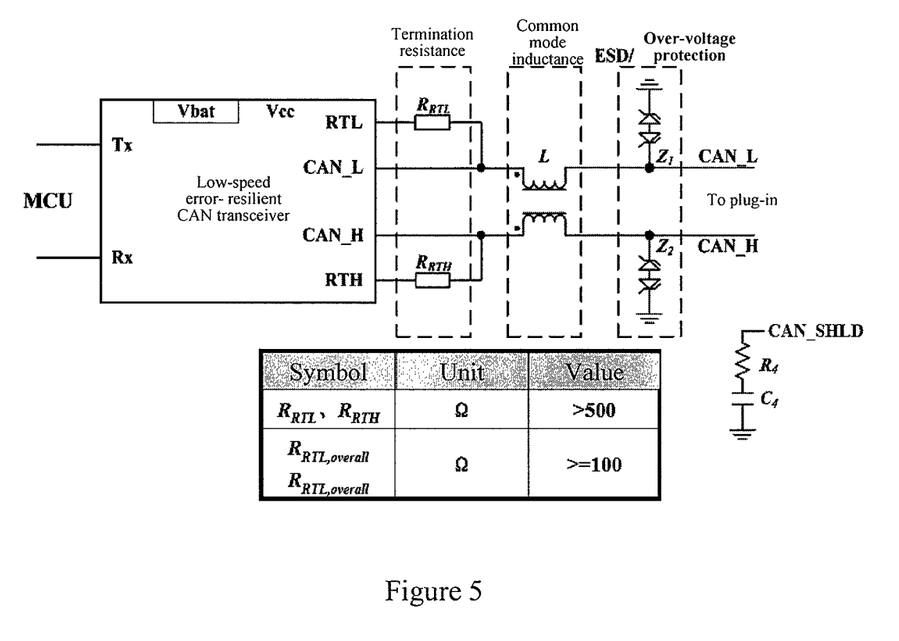
FIG. 5 is a reference circuit diagram of a low-speed CAN of the central control system.
Figure 6:
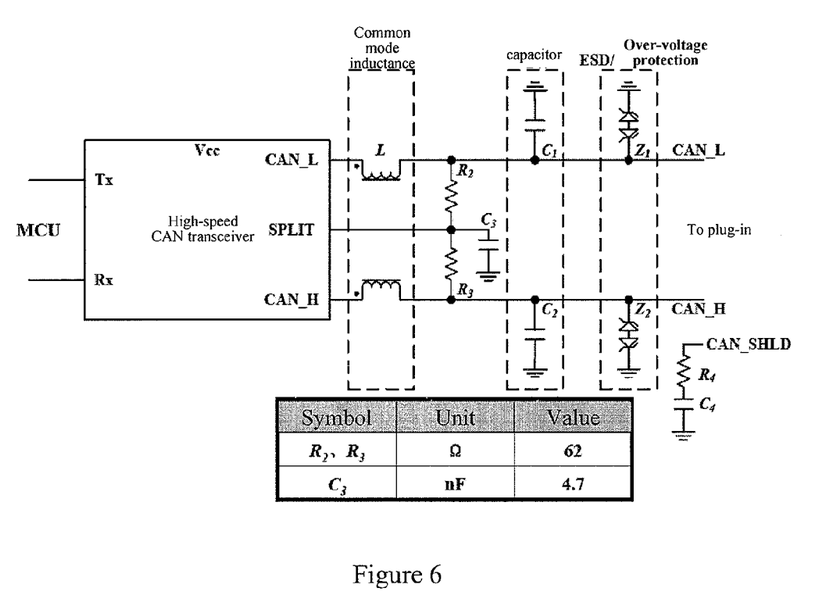
FIG. 6 is a reference circuit diagram of a high-speed CAN of the central control system.
Figure 7:
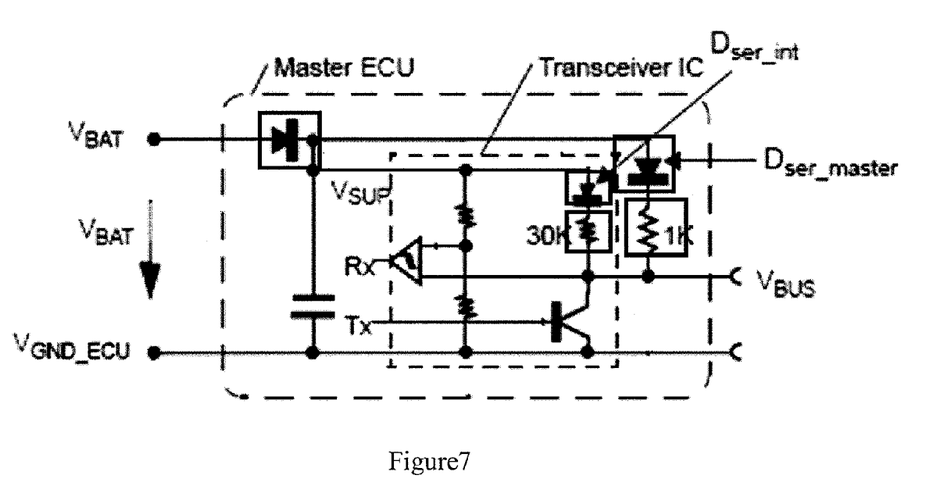
FIG. 7 is a reference circuit diagram of an LIN bus or K-Line of the central control system.

Due to communication between the central control system and the engine management system via the bus, both the central control system and the engine management system are provided with a communication bus interface (CAN/LIN/K-Line), and a circuit diagram of a CAN/LIN/K-Line bus transceiver can be as illustrated in FIG. 5 to FIG. 7. The circuit diagram can be modified so that the central control system and the engine management system will satisfy a communication requirement at the physical layer, wherein values of significant R (resistance) and C (capacitance) can be set to ensure that performance indexes of EMC (Electro Magnetic Compatibility) radiated interference and anti-interference will meet the requirement of the vehicle.

If a hardware communication interface is the CAN bus, then it can comply with the protocol of CAN2.0A, CAN2.0B, ISO11898 (for a high-speed CAN) or SAEJ2284 (for a low-speed CAN).

The foregoing central control antitheft system can be implemented simply with corresponding modifications to the remote key, the central control system and the engine management system of an existing vehicle without any additional new hardware device, thus resulting in an insignificant increase of the cost thereof. This solution can be applied widely due to its possible applications to numerous vehicle models. Identity verification can be performed between the remote control and the central control system and between the remote control and the engine management system in a secure hopping code algorithm, and in order to ensure a verified identity of the central control system, the central control system and the engine management system can further perform authentication in bidirectional communication. Thus, the engine can be started by a thief only if he is provided with two sets of algorithms, thereby achieving further improved security.

The embodiment of the system has been described briefly due to its substantial correspondence to the embodiment of the method, and reference can be made to a part of the descriptions for relevant details of the embodiment of the method. The embodiment of the system described above is merely illustrative, and the units described as separate components may or may not be physically separate, and a part or all of the modules can be selected as needed in practice to attain the object of the embodiment of the method. Those ordinarily skilled in the art can appreciate and implement them without any inventive effort.

The invention claimed is:

1. A vehicle central control antitheft method, comprising:
performing, by a central control system, identity verification for a remote control via cipher matching;
selecting, by the central control system, an alert status in response to a result of identity verification of the remote control, status of an ignition switch and an action of opening or closing a vehicle door, wherein the alert status comprises a pre-alerting status, an alerting status, an alarm activation status, and an alarm inactivation status;

encrypting, by the central control system, the alert status, and transmitting the encrypted alert status to an engine management system;

receiving and decrypting, by the engine management system, the encrypted alert status transmitted from the central control system, and determining whether the alert status is verified and is an alarm inactivation status;

performing safety authentication between the engine management system and the central control system in bidirectional encrypted communication once the alert status is verified and is the alarm inactivation status; and permitting, by the engine management, an engine to start after the safety authentication is passed.

2. The vehicle central control antitheft method according to claim 1, wherein the central control system communicates with the engine management system via a data bus.

3. The vehicle central control antitheft method according to claim 1, wherein the central control system performs identity verification for the remote control in a hopping code algorithm.

4. The vehicle central control antitheft method according to claim 1, wherein the engine management system performs identity verification for the central control system in a hopping code algorithm.

5. The vehicle central control antitheft method according to claim 3, wherein the hopping code algorithm is derived from Keelog algorithm or AES algorithm in which there are a cryptographic key of no less than 64 bits and a synchronous counter of no less than 16 bits.

6. The vehicle central control antitheft method according to claim 1, wherein the central control system transmits a cryptograph of the alert status of the central control system to the engine management system; and the engine management system decrypts the cryptograph and performs safety authentication with the central control system in bidirectional encrypted communication in the case that a decryption result is an alarm inactivation status.

7. The vehicle central control antitheft method according to claim 2, wherein the data bus is a CAN bus, LIN bus or K-Line bus.

8. The vehicle central control antitheft method according to claim 1, wherein the remote control is a remote key.

9. The vehicle central control antitheft method according to claim 1, wherein when the ignition switch of the vehicle is in the status OFF, the alert status comprises the pre-alerting status, the alerting status, the alarm activation status and the alarm inactivation status, which can transit to each other under different conditions; and when the ignition switch of the vehicle is in the status ON, the alert status comprises the alarm activation status and the alarm inactivation status, so that the alarm activation status can transition to the alarm inactivation status only upon unlocking via a remote key, and the alarm inactivation status cannot transition to the alarm activation status.

10. The vehicle central control antitheft method according to claim 9, wherein each time the alert status is changed, the central control system transmits latest alert status to the engine management system.

11. The vehicle central control antitheft method according to claim 1, wherein the engine management system locks or unlocks the engine by controlling oil rejection.

12. A vehicle central control antitheft system, comprising a remote control, a central control system and an engine management system, wherein:

the central control system performs identity verification for the remote control via cipher matching, selects an alert status in response to a result of identity verification of the remote control and status of an ignition switch and an action of opening or closing a vehicle door, encrypts the alert status, transmits the encrypted alert status to an engine management system, wherein the alert status comprises a pre- alerting status, an alerting status, and alarm activation status, and an alarm inactivation status; and the engine management system communicates with the central control system via a data bus, receives and decrypts the encrypted alert status transmitted from the central control system, determines whether the alert status is verified and is an alarm inactivation status, performs safety authentication with the central control system in bidirectional encrypted communication once the alert status is verified and is the alarm inactivation status, and permits an engine to start after the safety authentication is passed.

13. The vehicle central control antitheft system according to claim 12, wherein the data bus is a CAN bus, LIN bus or K-Line bus, and the remote control is a remote key.

14. The vehicle central control antitheft method according to claim 4, wherein the hopping code algorithm is derived from Keelog algorithm or AES algorithm in which there are a cryptographic key of no less than 64 bits and a synchronous counter of no less than 16 bits.

15. The vehicle central control antitheft method according to claim 2, wherein the central control system transmits a cryptograph of the alert status of the central control system to the engine management system; and the engine management system decrypts the cryptograph and performs safety authentication with the central control system in bidirectional encrypted communication in the case that a decryption result is an alarm inactivation status.

16. The vehicle central control antitheft method according to claim 2, wherein when the ignition switch of the vehicle is in the status OFF, the alert status comprises the pre-alerting status, the alerting status, the alarm activation status and the alarm inactivation status, which can transit to each other under different conditions; and when the ignition switch of the vehicle is in the status ON, the alert status comprises the alarm activation status and the alarm inactivation status, so that the alarm activation status can transition to the alarm inactivation status only upon unlocking via a remote key, and the alarm inactivation status cannot transition to the alarm activation status.

17. The vehicle central control antitheft method according to claim 2, wherein the engine management system locks or unlocks the engine by controlling oil rejection.

* * * * *